United States Patent Office 3,528,997
Patented Sept. 15, 1970

3,528,997
PROCESS FOR TREATING RESIDUAL LIQUORS FROM THE MANUFACTURE OF PHTHALIC ANHYDRIDE AND THE RECOVERY OF CITRACONIC AND MALEIC ANHYDRIDES AND ACIDS THEREFROM
Paul Juston and Pierre Guillermard, Chauny, France, assignors to Produits Chimiques Pechiney-Saint-Gobain, Neuilly-sur-Seine, France
No Drawing. Filed June 12, 1967, Ser. No. 645,496
Claims priority, application France June 13, 1966, 65,208
Int. Cl. C07c 57/02, 57/14
U.S. Cl. 260—346.8    3 Claims

ABSTRACT OF THE DISCLOSURE

The process for treatment of residual liquors from the preparation of phthalic anhydride by vapor phase oxidation of ortho-xylene comprising subjecting the liquor to a dehydration and anhydrization step in the presence of an organic solvent having a boiling point below 140° C. to effect removal of water and conversion of citraconic acid to a soluble phase in the organic solvent whereby the solvent phase can be removed for elimination of the solvent to deposit citraconic anhydride and which includes the pretreatment of the liquor for removal of maleic acid by the process of concentrating the liquor and cooling to crystallize maleic acid or by isomeric conversion of the maleic acid to fumaric acid which separates out, or by reaction of the maleic acid with a soda lye to form a separable acid metal maleate and in which maleic acid present in the residue remaining after removal of the citraconic anhydride is recovered by solution of the maleic acid in the residue in water for removal from the remainder.

---

This invention relates to the treatment of liquors which result from the preparation of phthalic anhydride, particularly from the preparation of phthalic anhydride by oxidation of ortho-xylene in the vapor phase. When ortho-xylene is oxidized from the vapor phase, the principal products obtained are phthalic anhydride with a number of secondary or by-products.

In some of the processes for recovery of phthalic anhydride, the gaseous components exhausted from the catalytic chamber are introduced into a solvent, or water, or an aqueous solution of the product to be prepared. In other processes, a part of the phthalic anhydride is condensed and the residual gases are extracted with water. In either event, after recovery of the phthalic anhydride or acid an aqueous liquor is obtained which contains various compounds, such as maleic acid, citraconic acid, aldehyde, ketones, phthalides, and other derivatives.

It is difficult to recover the various compounds. Often, solutions containing up to 40% by weight maleic acid are discarded to waste.

It is desirable to be able to recover various of the compounds from the liquor. On the other hand, in the absence of recovery, the resulting liquor constitutes a cumbersome by-product which is difficult to dispose of.

It is an object of this invention to provide a simple and inexpensive process for treatment of the residual liquors from the manufacture of phthalic anhydride and it is a related object to provide a process wherein various of the compounds can be recovered from residual liquors of the type described; which reduces the waste to a composition that can safely be discarded into sewers or the like without objection from the standpoint of odor and harm to animal or vegetable life in the water or surrounding areas; in which citraconic acid can be recovered in the form of an acid or anhydride, and in which maleic acid and anhydride can be recovered in a form substantially free of citraconic acid or anhydride.

The invention is addressed to a process for treatment of the liquors remaining from the fabrication of phthalic anhydride which comprise at least a step wherein citraconic acid, in the form of the anhydride, is extracted by dehydration and anhydrization with the use of a solvent having a boiling point less than 140° C. followed by separation of the solvent solution containing citraconic anhydride and the removal of solvent to yield the anhydride as a product.

It is also addressed to the extraction of citraconic acid and anhydride form the residual liquor and the extraction of maleic acid and maleic anhydride substantially free of citraconic acid or anhydride thereby to provide for the recovery of both the citraconic acid component and the maleic acid component in the form of the corresponding acids or anhydrides in a substantially purified state.

In accordance with one modification of the process of this invention, the residual liquor resulting from the preparation of phthalic anhydride, as previously described, and which is rich in maleic acid, is concentrated whereby a part of the maleic acid separates by crystallization to enable its removal. The remaining liquor is submitted to the described dehydration and anhydrization step by heating in the presence of a solvent having a boiling point less than 140° C. The citraconic acid in the form of the anhydride dissolved in the solvent is separated from the remainder and the solvent is distilled off to yield the citraconic anhydride.

In another modification of the practice of this invention, the residual liquor is subjected to an isomeric treatment which converts maleic acid to fumaric acid which can then be separated. The remaining liquor is then subjected to the described dehydration and anhydrization step by heating in the presence of a solvent having a boiling point less than 140° C. to effect solution and separation of the formed citraconic anhydride, followed by recovery upon removal of the solvent by distillation.

In accordance with a still further variation of the process, maleic acid in the residual liquor is converted to the acid metal maleate by partial neutralization. The acid metal maleate is separated and the remaining liquor is acidified and subjected to the previously described dehydration and anhydrization step for the recovery of citraconic anhydride.

Having briefly described the basic concepts of this invention, illustration will now be made by the following examples which are given by way of illustration, but not by way of limitation, of the practice of this invention:

EXAMPLE 1

As the starting material, use is made of 5 liters of a residual liquor derived from the fabrication of phthalic anhydride by oxidation of ortho-xylene. The residual liquor contains the following components expressed in grams per liter:

|  | G. |
| --- | --- |
| Phthalic acid | 24.5 |
| Maleic acid | 302 |
| Citraconic acid | 46.6 |
| Fumaric acid | 2.9 |
| Benzoic acid | 3 |

The 5 liters of residual liquor are introduced with 5 liters of benzene into an apparatus of the type employed for azeotropic distillation comprising a reactor vessel fitted for heating as by electrical means or by the circulation of hot fluids and which also is provided with an agitator, a bottom drain, a reflux condenser and means for recycle of solvent after distilling off water. The materials are heated to reflux temperature during which benzene carries off water from the solution to effect dehydration and anhydrization. When water no longer distills off with the benzene, a benzene layer remains which contains the citraconic acid in the form of its anhydride in solution.

The solution is separated from the remainder and the benzene is removed by distillation to leave citraconic anhydride.

In the described process, 3402 grams of water are removed and collected during the dehydration and anhydrization step. The benzene solution yields 184 grams of citraconic anhydride which corresponds to 214 grams of citraconic acid. To the 1745 grams of residue remaining, containing maleic acid, phthalic acid and some fumaric acid, water is added to dissolve the maleic acid. The system is filtered and the solution is treated for the anhydrization of maleic acid. Under these conditions, maleic acid of good quality is obtained in a yield of 84% of the maleic acid originally present in the residual liquors.

EXAMPLE 2

Use is made of a 10 liter flask having a bottom drain, means for heating the flask and a reflux cooler connected to a collection flask and a neck for connection to a vacuum generating means for maintaining sub-atmospheric conditions within the flask. 5 liters of residual liquor from the preparation of phthalic anhydride are introduced, having the following composition, expressed in grams per liter:

|  | G./l. |
|---|---|
| Phthalic acid | 24.7 |
| Maleic acid | 302.8 |
| Citraconic acid | 46.6 |
| Fumaric acid | 2.9 |
| Benzoic acid | 3.0 |

The solution is heated to a temperature below 60° C. under a vacuum of 50–60 mm. of mercury to distill off water until the total of about 2.77 liters of water are distilled off. The liquor in the flask is then cooled to cause crystallization of maleic acid which is separated by centrifugal separation and dried. The separated crystals, weighing 1709 g., are composed of 1432 g. of maleic acid, 120 g. of phthalic acid, 75 g. of citraconic acid, 11.5 g. of fumaric acid and 7 g. of benzoic acid.

The 418 g. of residual material contains 156 g. of citraconic acid, 76.6 g. maleic acid, 8 g. benzoic acid and 2.5 g. of fumaric acid.

The liquor is placed in a 3 liter flask having an azeotropic distillation column and it is heated to reflux in the presence of .75 liter of benzene for 4 hours. The benzene solution phase is syphoned off and is analyzed to contain 126 g. of citraconic anhydride in solution. The solvent is distilled off and condensed for recycling to the system and the remaining anhydride is submitted to rectification at low pressure in a fractionation column. After removal of the small quantity from the top of the column, a product of 103 g. of citraconic anhydride is recovered in which the citraconic anhydride has the boiling point, titer and Hazen color of pure citraconic anhydride. The portions taken off at the top or the initial part of the distillation, rich in citraconic anhydride, can be re-submitted to fractionation further to increase the yield.

The residual liquors from the oxidation of orthoxylene, in the preparation of phthalic anhydride, containing the aforementioned compounds, also contains some amounts of dimethylmaleic anhydride and phthalides. These compounds remain in the tailing cuts of the fractionation of citraconic anhydride and are easily extracted therefrom. For treating the crystals one proceeds as follows: In a 10 liter container having an azeotropic distillation column, 1700 g. of the crystals are introduced with 3000 g. of benzene and heated to reflux. After 6 hours at 80° C., 75 g. of water is removed. After cooling, the benzene solution is syphoned off and the benzene is distilled from the removed solution to yield 64 g. of citraconic anhydride.

The remaining crystals are dissolved in 2.45 liters of water to form a solution containing 400 g. per liter of maleic anhydride. The fumaric acid, phthalic acid and benzoic acid remain insoluble and are separated off by filtration.

After filtration on activated carbon, the solution is introduced in an intermediate stage of a fractionation column through which vapors of ortho-xylene are circulated. The water of solution and the water of dehydration to form maleic acid into a maleic anhydride are carried off by the solvent vapors. The vapors are condensed and recycled. The maleic anhydride collects in the bottom of the column from which it is periodically moved. At the end of the operation, 2603 g. of water containing 78 g. of maleic acid are collected. The raw maleic anhydride removed from the bottom of the column corresponds to 1042 g. or a 93.2% transformation yield, taking into account the amount lost in the condensed water. After distillation, 930 g. of pure maleic anhydride are collected giving a yield of 83% based upon the acid present in the crystals after washing. The main distillation fraction, corresponding to 96.7% of the distilled mass, gives a solidification point above 52° C. Analysis shows complete absence of citraconic anhydride and only traces of benzoic acid in the maleic anhydride that is produced.

EXAMPLE 3

10 liters of residual liquor resulting from the preparation of phthalic anhydride by oxidation of ortho-xylene are introduced into a container provided with an agitator, a bottom drain and heating and cooling means. The residual liquor has the following ingredients:

|  | G./l. |
|---|---|
| Phthalic acid | 15.8 |
| Maleic acid | 319 |
| Citraconic acid | 51.4 |
| Benzoic acid | 5 |

The liquor is heated gradually in the presence of a catalyst for isomerization of maleic acid into fumaric acid. After 2 hours at 95° C., fumaric acid is formed and the acid crystallizes out upon cooling.

After centrifugal separation 2830 g. of raw fumaric acid are obtained and 7.8 liters of mother liquor containing the following:

|  | G. |
|---|---|
| Maleic acid | 135 |
| Fumaric acid | 222 |
| Citraconic acid | 510 |
| Benzoic acid | 46 |

The mother liquor is concentrated under vacuum conditions and crystallized by cooling and the crystals are separated by centrifuge. 1300 g. of liquid concentrates containing almost all of the citraconic acid in the original liquor and the maleic acid which is not isomerized are obtained. The liquor concentrate is submitted to azeotropic distillation with benzene heated to reflux temperature for extracting the citraconic acid as the corresponding anhydride in accordance with the dehydration and anhydrization steps described in the foregoing examples. After fractional distillation of raw anhydride, 358 g. of pure citraconic anhydride are obtained. The yield is 81% based upon the acid present in the treated liquor.

EXAMPLE 4

To 4 liters of residual liquor from the production of phthalic anhydride by oxidation of ortho-xylene, having the following composition:

|  | G./l. |
|---|---|
| Maleic acid | 311 |
| Citraconic acid | 74.2 |
| Phthalic acid | 14.7 |
| Benzoic acid | 2.7 | there is slowly added, with cooling, .9 liter of caustic soda lye in a concentration of 600 g. per liter. The acid sodium salt of maleic acid precipitates. The system is cooled for a number of hours and the crystals formed are separated by centrifuge, washed and dried in an oven at 100° C. 1427 g. of acid sodium maleate are obtained titrating 98.8% of anhydrous salt. This corresponds to a yield of 95.2% of the maleic acid originally present. The wash water used to wash the crystals is syphoned off. 175 g. of concentrated sulphuric acid are added to the 3.6 liters of mother liquor. This treatment is adapted to set free the acids other than maleic acid which had been solubilised by partial transformation into soluble sodium salts. The solution is concentrated at low pressure and then allowed to stand for crystallization. By centrifugal separation of the formed crystals, 463 g. of wet crystals are obtained composed mainly of hydrated sodium sulphate, leaving 627 g. of liquid concentrate containing the following:

| | G. |
|---|---|
| Maleic acid | 55 |
| Citraconic acid | 280 |
| Phthalic acid | 23 |
| Benzoic acid | 9 |

The liquid concentrate is heated to reflux with 1.1 liters of benzene. The solution formed of the components dissolved in the benzene is syphoned off and distilled. 197 g. of pure citraconic anhydride are obtained, corresponding to a yield of 82% of the citraconic acid present in the concentrate and 77% of the acid originally contained in the residual liquors.

It will be apparent from the foregoing description that treatment of the residual liquors will yield products of good quality which are otherwise lost. It is possible, by the practice of this invention, to recover a pure maleic anhydride; PF>52° C. and titrating 99.6–99.8% of maleic anhydride and a citraconic anhydride content less than 0.1%; a fumaric acid titrating at 99.8% and citraconic anhydride titrating: citraconic anhydride 98.7%; maleic anhydride 0.008% and dimethylmaleic anhydride 1.2%.

If desired, it is also possible to recover other derivatives by the use of conventional processes of recovery since such other products are already freed from the maleic acid and citraconic acids originally present in the mother liquor.

It will be understood that changes may be made in the details of formulation and operation without departing from the spirit of the invention, especially as defined in the following claims.

What is claimed is:

1. In the process for treatment of residual liquor containing citraconic acid and maleic anhydride in solution for the recovery of said acid, the steps of adding a solution of soda lye to the residual liquor for reaction to convert maleic acid to the corresponding acid metal maleate, separating the maleate from the liquor, reacidifying the liquor, adding an organic solvent having a boiling point below 140° C. and in which citraconic acid anhydride is soluble, heatng the mixture to carry out water of dehydration and anhydrization, separating the formed citraconic anhydride solution and vaporizing off the solvent from the separated solution phase to yield citraconic anhydride.

2. The process as claimed in claim 1 in which the organic solvent is benzene.

3. The process as claimed in claim 1 in which the dehydration and anhydrization step is carried out by heating to reflux temperature whereby water is carried off with a part of the solvent.

References Cited

UNITED STATES PATENTS

| 2,942,006 | 6/1960 | Becker. | |
| 3,007,942 | 11/1961 | Burney et al. | 260—346.3 |
| 3,098,095 | 7/1963 | Knobloch et al. | 260—346.3 |
| 3,455,963 | 7/1969 | Guillermard et al. | 260—346.2 |

ALEX MAZEL, Primary Examiner

B. I. DENTZ, Assistant Examiner

U.S. Cl. X.R.

260—346.7, 537